United States Patent [19]

Gehrmann

[11] Patent Number: 5,382,980
[45] Date of Patent: * Jan. 17, 1995

[54] METHOD OF AND ARRANGEMENT FOR INSERTING A BACKGROUND SIGNAL INTO PARTS OF A FOREGROUND SIGNAL FIXED BY A PREDETERMINED KEY COLOR

[75] Inventor: Rainer Gehrmann, Alsbach-Hähnlein, Germany

[73] Assignee: U.S. Philips Corporation, New York, N.Y.

[*] Notice: The portion of the term of this patent subsequent to Jan. 10, 2012 has been disclaimed.

[21] Appl. No.: 197,034

[22] Filed: Feb. 16, 1994

Related U.S. Application Data

[63] Continuation-in-part of Ser. No. 986,329, Dec. 7, 1992.

[30] Foreign Application Priority Data

Dec. 30, 1991 [DE] Germany ............... 4143180
Jun. 24, 1993 [DE] Germany ............... 4321010

[51] Int. Cl.6 ............................................ H04N 9/74
[52] U.S. Cl. .................................... 348/586; 348/591
[58] Field of Search ............... 348/586, 587, 595, 591, 348/592; 358/22 CK, 22 PP; H04N 9/74, 9/75

[56] References Cited

U.S. PATENT DOCUMENTS

| | | | |
|---|---|---|---|
| 4,667,221 | 5/1987 | Cawley | 348/587 |
| 4,811,084 | 3/1989 | Belmares-Sarabia | 348/586 |
| 4,949,165 | 8/1990 | Riemann | 348/587 |
| 5,249,039 | 9/1993 | Chaplin | 348/587 |
| 5,301,016 | 4/1994 | Gehrmann | 348/586 |

Primary Examiner—James J. Groody
Assistant Examiner—Sherrie Hsia
Attorney, Agent, or Firm—Edward W. Goodman

[57] ABSTRACT

A method of inserting a background signal (BG) into parts of a foreground signal (FG), which parts are fixed by a predetermined key color (KC), in which method a control signal (k) is derived from the foreground signal (FG), which control signal assumes a first value when the foreground signal (FG) represents a color in the region of the key color (KC) and a second value when the foreground signal (FG) represents a different color, in which the control signal (k) has a transition range between the two values, and in which a difference, influenced by the control signal (k), between the vector of the background signal (BG) and the vector of a signal (KC) representing the key color is vectorially added to the foreground signal (FG) in accordance with Patent (U.S. patent application Ser. No. P 41 43 180.4), as well as an arrangement for performing this method. A further improvement of the picture quality while using a small number of components is achieved in that the background signal (BG), the signal (KC) representing the key color and the foreground signal (FG) each comprise a component representing the blue component (Cb) and the red component (Cr) as well as a luminance component (Y) and, as regards all their components, the signals are combined in the corresponding, afore-mentioned manner.

5 Claims, 2 Drawing Sheets

METHOD OF AND ARRANGEMENT FOR INSERTING A BACKGROUND SIGNAL INTO PARTS OF A FOREGROUND SIGNAL FIXED BY A PREDETERMINED KEY COLOR

CROSS-REFERENCE TO RELATED APPLICATIONS

This is a continuation-in-part of parent application Ser. No. 07/986,329, filed Dec. 7, 1992;

BACKGROUND OF THE INVENTION

1. Field of the Invention

The invention relates to a method of inserting a background signal into parts of a foreground signal, which parts are fixed by a predetermined key color, in which method a control signal is derived from the foreground signal, which control signal assumes a first value when the foreground signal represents a color in the region of the key color and a second value when the foreground signal represents a different color, in which the control signal has a transition range between the two values, and in which a difference, influenced by the control signal, between the vector of the background signal and the vector of a signal representing the key color is vectorially added to the foreground signal.

2. Description of the Related Art

U.S. patent application Ser. No. P 41 43 180.4, corresponding to the above-noted U.S. parent application, discloses such a method and an arrangement for performing this method. This main Patent relates to a method of inserting a background signal into parts of a foreground signal, in which method a vector, influenced by the control signal, of the difference between the background signal and a predetermined key color is added to the foreground signal. In the most general formulation of the teachings of the main Patent no detailed explanation of the structure of the background signal, of the signal representing the key color and of the foreground signal is given, because the teachings of the main Patent are independent of the special implementation of these signals. In a special implementation of the teachings of the main Patent, given components of these signals are preferably to be processed in accordance with the teachings of the main Patent. In accordance with the teachings of the main Patent, particularly only the chrominance signals are processed, whereas another method is chosen for processing the luminance signals, in which method the luminance component is not extracted subtractively but is rather complementarily faded. Smooth transitions between the picture parts given by the foreground signal and the background signal can then be obtained and particularly the blue fringes can be effectively reduced. Fading of the luminance signals with the complement of the control signal derived from the chrominance components supersedes the additional determination of a separate control signal from the luminance components for the purpose of fading these components.

SUMMARY OF THE INVENTION

It is an object of the invention to achieve a further improvement of the picture quality while using a small number of components.

According to the invention, in a method of the type described in the opening paragraph, this object is achieved in that the background signal, the signal representing the key color and the foreground signal each comprise a component representing the blue component and the red component as well as a luminance component and, as regards all their components, said signals are combined in the corresponding, afore-mentioned manner.

In the method according to the invention, the luminance component is thus treated in the same way as the chrominance components (blue component and red component), which is in contrast to the preferred embodiment of the main Patent. This method proves to be particularly advantageous when the control factor in the color plane reflects the actual share of the key color in a mixing signal and is not derived from an arbitrarily chosen, closed key color region. In the preferred method according to the main Patent, each share of a mixing color in the signal representing the key color is linearly exchanged for a correspondingly large share of the color components of the background signal in the case of a correct determination of the control signal. A good quality of the color reproduction is then obtained in that the control signal represents the true share of the mixing color in the key color. The present invention now proves that this control signal-influenced exchange of the signal representing the key color for the background signal does not only lead to better results for the color components but also for the luminance components of the signals.

It is particularly advantageous that, in accordance with the present invention, no control signal which is new and independent, as compared with the teachings of the main Patent, is to be generated for fading the luminance component, which control signal is to represent the correct share of the luminance component of the signal representing the key color. In fact, it turns out that the control signal determined for the chrominance components can also be successfully used for fading the luminance components. In accordance with the teachings of the main Patent, the control signal is determined in such a way that its value represents the relative share of the signal representing the key color, which share is present in a mixing signal at an edge of an object represented in the foreground or being present in a shady part of the blue wall in front of which the object is recorded in the foreground signal. The control signal represents this relative share as regards the largest possible saturation occurring in the picture. All proportional values of the signal representing the key color formed by variation of the control signal are then located on a straight line when the signals to be processed are represented in the color plane, which straight line starts at the origin of this color plane, where the control signal disappears, and ends at the point in the color plane which represents the key color, where the control signal assumes the value 1.

BRIEF DESCRIPTION OF THE DRAWINGS

These and other aspects of the invention will become apparent from and elucidated with reference to the accompanying drawings, in which.

DESCRIPTION OF THE PREFERRED EMBODIMENT

Figure 1:
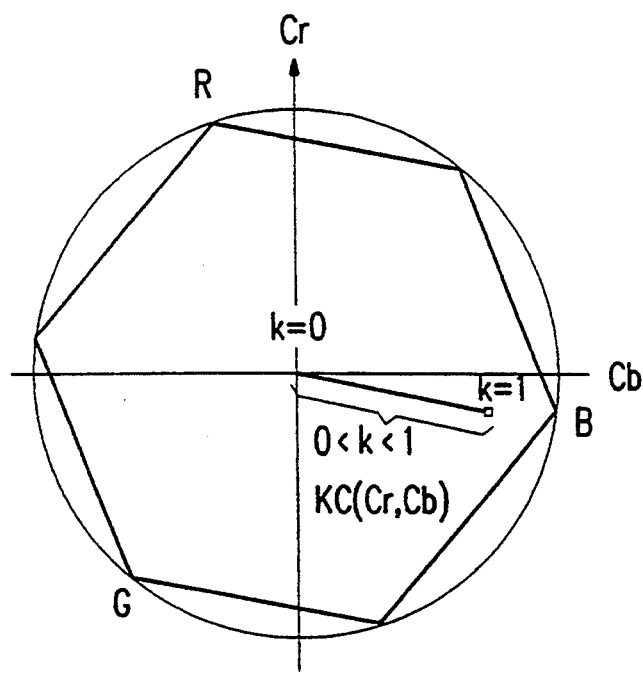
FIG. 1 shows a diagram of the color plane.

FIG. 1 shows the afore-described situations with reference to the color plane in which the chrominance signals Cb for blue and Cr for red are shown in the system of coordinates. By corresponding linear combination of these chrominance signals, the chromaticity to be represented is obtained, in which the colors red (R), green (G) and blue (B) can be found in the color planes at the corners of the hexagon shown. The point KC(Cr,Cb) represents the color of the blue wall in the example shown; for this point the control signal k assumes the value 1. Between the origin of the system of coordinates subtended by Cb and Cr, where the control signal disappears (k=0), and the chromaticity value of the blue wall at the key color KC(Cr, Cb), the control signal k varies between the values 0 and 1; at such a variation, a straight line between the origin and the point KC(Cr,Cb) is obtained in the color plane. The control signal k known already from the main Patent represents the relative share of the chrominance signal of the key color KC(Cr,Cb), which share is present in a mixing signal at an edge of an object represented in the foreground signal or being present in a shady area of the blue wall. This relative share is derived from the largest possible saturation occurring in the picture. Consequently, all proportional values of the key color are located on the described straight line in the color plane between the origin (k=0) and the key color at KC(Cr,Cb) for which k=1, because these proportional values have been obtained by fading of the key color.

Figure 2:
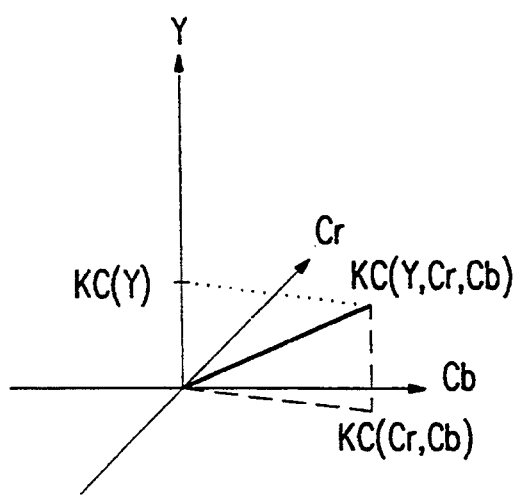
FIG. 2 shows an isometric representation of the color space.

It appears that this situation is also relevant for the luminance component Y. For the purpose of explanation, reference is made to FIG. 2 showing an indicated, isometric representation of the color space. This space is subtended by the color plane shown in FIG. 1 whose coordinates Cb and Cr are shown in FIG. 2 again, as well as by a diagram axis representing the luminance component Y, which axis is perpendicular to the color plane. In the color space, a luminance component KC(Y) is associated with the signal value KC(Cr,Cb) of the key color in the color plane; the signal representing the key color thus has the value KC(Y,Cr,Cb) in the color space. If a straight line is subtended between the origin of the color space, which is simultaneously the origin of the color plane, and the signal value KC(Y,Cr,Cb), the shares of the key color faded by variation of the control signal k, including its luminance component, are obtained on this straight line. With the relative color component of the signal KC representing the key color, which signal is described by the control signal k, a relative luminance component along the axis Y is defined simultaneously. Consequently, no new control signal needs to be introduced for fading the luminance component. Preferably, the maximum value of the luminance component to be used, i.e. the luminance component of the key color KC(Y), is not arbitrarily chosen, but it should correspond exactly to the value of the luminance component of the blue wall at those positions where the amount of the chrominance signal KC(Cr,Cb) of all points on the blue wall assumes the highest value.

The method according to the invention particularly leads to a good reproduction of reflexes and shades on transparent objects which are represented in the original picture as slightly varying shades of the color blue. In the keying process—i.e. separation of the foreground objects to be inserted in the background from the key color—a "presumed" luminance component is also defined, according to the invention, when the actually found chrominance signal component has been determined, as is shown by the straight line in FIG. 2. The luminance components corresponding to the straight line are completely replaced when the foreground object is inserted in the background. Deviations of the foreground mixing signal or of the luminance component of this signal from the straight line, as shown in FIG. 2, should, however, have their origin in the luminance component of the foreground signal, i.e. they are not caused by irregularities of the blue wall. Consequently, they are retained as such. Based on the linear determination of each proportional value of the signal KC representing the key color up to the highest possible value, each nuance of a deviation from the straight line is detected and represented as an object in the foreground signal, i.e. it is superimposed on the background signal.

In accordance with an advantageous further embodiment of the method according to the invention, an output signal with an inserted background is formed in accordance with the following equation which is valid for all components:

$$OUT(Y,Cr,Cb) = FG(Y,Cr,Cb) + + k \cdot [BG(Y,Cr,Cb) - KC(Y,Cr,Cb)].$$

The transition range then extends preferably as far as the center of the foreground colors and the control signal represents the vectorial, relative color component of the key color in a mixing color. Particularly the blue fringes are eliminated in this way.

In an arrangement for performing the method according to the invention, all components of the background signal and the signal representing the key color can be applied to a first adder in such a way that the signal representing the key color is subtracted from the background signal, that an output of the adder is connected to a first input of a multiplier, to whose second input the control signal can be applied, and that an output of the multiplier is connected to a first input of a second adder, to whose second input the foreground signal can be applied.

Figure 3:
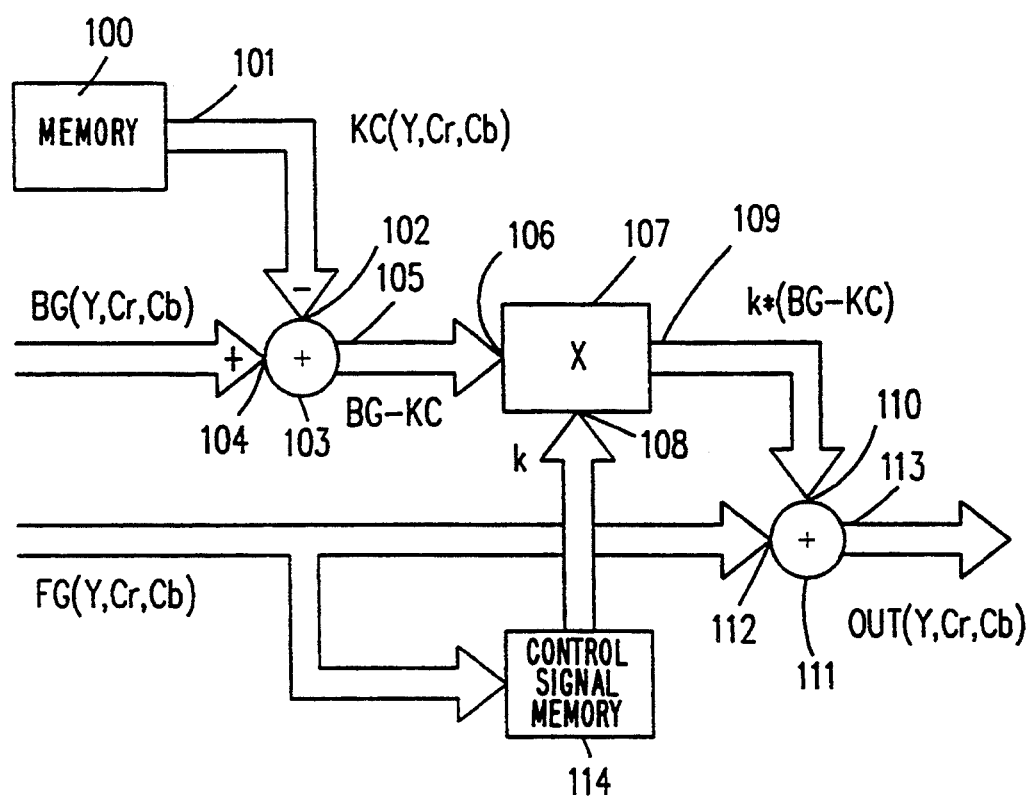
FIG. 3 shows, in block diagram form, an arrangement for performing the method.

An example of such an arrangement is shown in FIG. 3. The reference numeral 100 denotes a memory whose output 101 supplies the signal KC(Y,Cr,Cb) representing the key color. This signal KC comprises both a luminance component and—as chrominance components—a blue component Cb and a red component Cr. It is applied to a first input 102 of a first adder 103. The first input 102 of the first adder 103 is either formed as a subtracting input, as is shown in FIG. 3, or the sign of the signal KC is already inverted in the memory 100. A background signal BG(Y,Cr,Cb) with all its components (luminarice component, red component, blue component) is applied to a second input 104 of the first adder 103. The output 105 of the first adder 103 supplies a signal representing the difference between the background signal BG and the signal KC representing the key color and this signal is applied to a first input 106 of a multiplier 107. The multiplier 107 has a second input 108 which receives the control signal k. The difference signal from the first input 106 is multiplied by this control signal k. The signal thus formed, which is supplied at the output 109 of the multiplier 107, represents the control signal-influenced difference between the background signal and the signal representing the key color. It is applied to a first input 110 of a second adder 111 whose second input 112 receives the foreground signal FG with all its components (Y,Cr,Cb). The output signal OUT is then supplied at the output 113 of the second adder 111, which output signal also consists of a luminance component, a blue component and a red component.

The arrangement shown in FIG. 3 further comprises a control signal memory 114 which, as described in the main Patent, may be implemented as a write-read memory. The control signal k is generated from the foreground signal FG in this control signal memory 114 in the manner described in the main Patent.

I claim:

1. A method of inserting a background signal (BG) into parts of a foreground signal (FG), said parts being fixed by a predetermined key color, said method including the step of deriving a control signal (k) from the foreground signal, said control signal having a first value when the foreground signal (FG) represents a color in the region of the key color, and a second value when the foreground signal (FG) represents a different color, in which the control signal (k) has a transition range between the first and the second values, and in which a difference, influenced by the control signal (k), between a vector of the background signal (BG) and a vector of a signal (KC) representing the key color is vectorially added to the foreground signal (FG), characterized in that the background signal (BG), the signal (KC) representing the key color and the foreground signal (FG) each comprise components representing a blue component (Cb), a red component (Cr) and a luminance component (Y), and said components are combined, respectively, in accordance with said method.

2. A method as claimed in claim 1, characterized in that an output signal (OUT) with an inserted background is formed in accordance with the following equation which is valid for all components:

$$OUT(Y,Cr,Cb) = FG(Y,Cr,Cb) + k \cdot [BG(Y,Cr,Cb) - KC(Y,Cr,Cb)].$$

3. A method as claimed in claim 1, characterized in that the transition range extends as far as a center of the colors represented by the foreground signal, and the control signal (k) represents a vectorial, relative color component (KC(Cr)) of the key color in a mixing color.

4. An arrangement for inserting a background signal (BG) into parts of a foreground signal (FG), said parts being fixed by a predetermined key color, said arrangement including means for deriving a control signal (k) from the foreground signal, said control signal having a first value when the foreground signal (FG) represents a color in the region of the key color, and a second value when the foreground signal (FG) represents a different color, in which the control signal (k) has a transition range between the first and the second values, and in which a difference, influenced by the control signal (k), between a vector of the background signal (BG) and a vector of a signal (KC) representing the key color is vectorially added to the foreground signal (FG), characterized in that said arrangement comprises a first adder having first input means for receiving all components of the background signal (BG) and second input means for receiving an inverse of the signal (KC) representing the key color; a multiplier having first input means coupled to output means of said first adder, and second input means coupled to an output of said means for deriving the control signal; and a second adder having first input means coupled to an output of the multiplier and second input means to which the foreground signal is applied, output means of said second adder forming an output of said arrangement.

5. A method as claimed in claim 2, characterized in that the transition range extends as far as a center of the colors represented by the foreground signal, and the control signal (k) represents a vectorial, relative color component (KC(Cr)) of the key color in a mixing color.

* * * * *